(12) United States Patent
Ruiz

(10) Patent No.: US 6,717,669 B2
(45) Date of Patent: Apr. 6, 2004

(54) SELF-CALIBRATING SPECTROMETERS AND AUTO-CALIBRATION METHODS

(75) Inventor: Javier Ruiz, Oceanside, CA (US)

(73) Assignee: SCI Instruments, Inc., Carlsbad, CA (US)

( * ) Notice: Subject to any disclaimer, the term of this patent is extended or adjusted under 35 U.S.C. 154(b) by 2 days.

(21) Appl. No.: 10/091,836

(22) Filed: Mar. 6, 2002

(65) Prior Publication Data

US 2003/0169420 A1 Sep. 11, 2003

(51) Int. Cl.[7] .............................. G01J 3/28; G01J 3/02
(52) U.S. Cl. ...................................... 356/328; 356/307
(58) Field of Search ................................. 356/307, 326, 356/328

(56) References Cited

U.S. PATENT DOCUMENTS 3,874,799 A * 4/1975 Isaacs et al. ................ 356/402

\* cited by examiner

Primary Examiner—F. L. Evans
(74) Attorney, Agent, or Firm—Kenneth W. Float

(57) ABSTRACT

Auto-calibrating spectrometers and methods that measure transmission or reflection versus wavelength of a sample without need for calibration for long periods of time. Reflection and transmission spectrometers along with auto-calibrating methods for use therewith are disclosed. Light is focused onto a sample using a lens or similar optical element that transmits light towards the sample reflects light impinging upon it, and transmits light reflected from the sample. If one monitors the light reflected from the first lens and sample, very useful information is available related to the system response versus time. The present invention monitors the reflected light from the first lens and sample, and corrects for the system changes over time using this reflected light.

18 Claims, 3 Drawing Sheets

SELF-CALIBRATING SPECTROMETERS AND AUTO-CALIBRATION METHODS

BACKGROUND

The present invention relates generally to spectrometers, and more particularly, to self-calibrating spectrometers.

Typically, in order to calibrate a spectrometer, a reference sample having known reflection or transmission characteristics must be measured. Subsequently upon measuring a sample of unknown reflection or transmission, the spectrometer will compare the signal obtained using the unknown sample to the signal obtained using the reference and then will calculate the absolute reflection or transmission from this ratio.

If the conditions present at the time of reference measurement do not change, then the calibration is valid and the measurements on the unknown samples will be accurate. This is an ideal case.

However, some of the parameters that will cause the system response of the spectrometer to change with time include (1) lamp intensity changes, since all lamps burn down or degrade, (2) optical fibers can be inadvertently re-positioned or bumped, (3) at UV wavelengths, fiber-optic materials solarize, causing the transmission of the fibers to degrade with time, and (4) dust can collect on system elements causing the transmission of the spectrometer to degrade. Consequently, it would be desirable to have a spectrometer that is self calibrating.

Many spectrometers are designed so that a reference sample is measured every time an unknown sample is measured. A dual beam spectrophotometer is a good example of such an instrument. However, this type of instrument is large and expensive, and as such, it is not practical for certain applications such as in-situ monitoring, where it is desired to monitor the etch or deposition of coatings inside of a process chamber. This system also has multiple moving parts that make the system more susceptible to mechanical failure.

It is therefore an objective of the present invention to provide for self-calibrating spectrometers.

SUMMARY OF THE INVENTION

To accomplish the above and other objectives, the present invention provides for auto-calibrating spectrometers and methods that measure transmission or reflection versus wavelength of a sample without need for calibration for long periods of time, up to 15 days or more. Reflection and transmission spectrometers along with auto-calibrating methods for use therewith are disclosed. Light is focused onto a sample using a lens or similar optical element that transmits light towards the sample reflects light impinging upon it, and transmits light reflected from the sample. If one monitors the light reflected from the first lens and sample, very useful information is available related to the system response versus time. The present invention monitors the reflected light from the first lens and sample, and corrects for the system changes over time using this reflected light.

An exemplary reflection spectrometer comprises a light source, an optical element that transmits light and reflects a small amount of light, and a detector for outputting electrical signals corresponding to light signals that are detected thereby. Optical coupling apparatus, such as a fiber optic cable, or lens and beam splitter combination, couples light from the light source to the optical element. The fiber optic cable preferably comprises at least one illumination fiber for coupling light to a sample under measurement and a detector fiber that collects light reflected from the optical element and directs it to the detector. A shutter assembly may be used to selectively couple light or inhibit light from impinging upon and reflected by a reference sample having known reflection or the sample under measurement. A controller is coupled to the detector that processes the electrical signals output thereby and implements an algorithm that calculates a calibration value for the spectrometer at each wavelength of light output by the light source using a predetermined equation to autocalibrate the spectrometer.

An exemplary transmission spectrometer further includes a second focusing lens for receiving light that is transmitted by or reflected off of the sample under measurement toward it, a second detector coupled to the controller, and a second fiber optic cable for coupling light received by the second focusing lens to the second detector. In the transmission spectrometer, the controller processes the electrical signals output by both detectors and implements an algorithm that calculates a calibration value for the spectrometer at each wavelength of light output by the light source using a second predetermined equation to autocalibrate the spectrometer.

Important aspects of the present spectrometers include a low manufacturing cost and self calibration. Also, in a reduced-to-practice embodiment, there are only two moving parts (shutters) that in several configurations or applications, are not required. Furthermore, the spectrometers are ideally suited for in-situ monitoring applications.

An exemplary auto-calibrating method for use with a reflection spectrometer comprises the following steps. An initial calibration of the spectrometer is performed. A background scan is performed with the light source on and the shutter assembly closed. A background scan is performed, if required, with the light source off and the shutter assembly open. A background scan is performed with the light source off and the shutter assembly closed. A sample scan of the sample under measurement is performed with the light source on and shutter assembly open.

An exemplary auto-calibrating method for use with a transmission spectrometer comprises the following steps. An initial calibration of the spectrometer. A background scan of the first and second detectors is performed with the light source on and the shutter assembly closed. A background scan is performed, if required, of the first and second detectors with the light source off and the shutter assembly open. A background scan is performed, if required, of the first and second detectors with the light source off and the shutter assembly closed. A sample scan is performed using the first detector of an unknown sample with the light source on and shutter assembly open.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
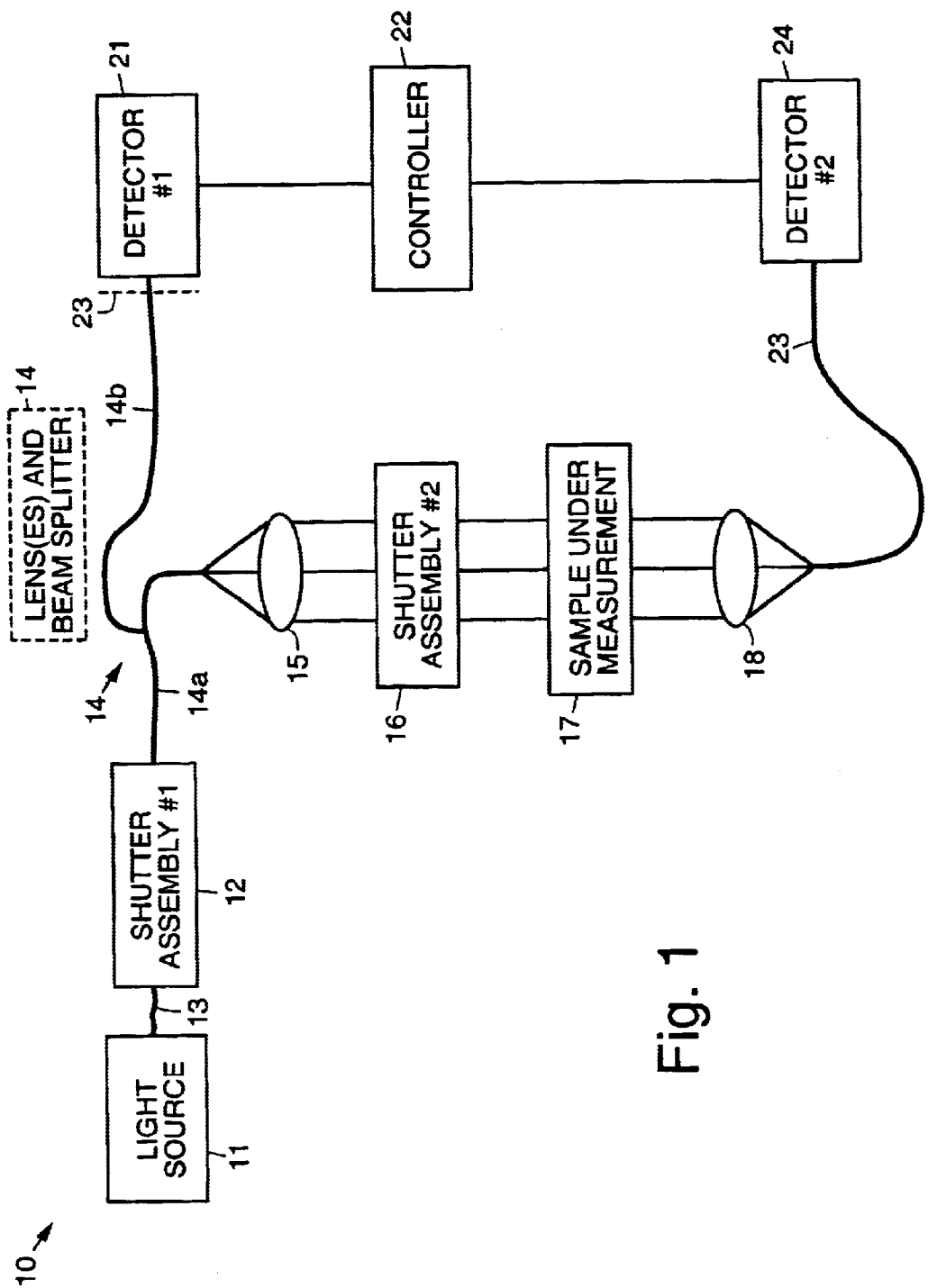
FIG. 1 is a system block diagram that illustrates an exemplary auto-calibrating fiber-optic spectrometer in accordance with the principles of the present invention.

Referring to the drawing figures, FIG. 1 is a system block diagram that illustrates various embodiments of exemplary auto-calibrating fiber-optic spectrometers 10 in accordance with the principles of the present invention. A basic auto-calibrating fiber-optic spectrometer 10 (or reflection spectrometer 10) comprises the following components (which includes selected components shown in FIG. 1).

A light source 11 or lamp 11 is coupled by way of a first fiber optic cable 13 to a first shutter assembly 12. A reduced-to-practice embodiment of the spectrometer 10 employs a polychromatic light source 11. However, the present invention also works just as well for single wavelength applications. Consequently, the light source 11 may be a single wavelength (monochromatic) light source 11.

The light output of the first shutter assembly 12 is coupled by way of optical coupling apparatus 14 comprising a second fiber optic cable 14, for example, to a first focusing lens 15. However, it is to be understood that the lens 15 may be an optical element 15 that transmits light and reflects a small amount of light. The first focusing lens 15 has a focal plane at an adjacent end of the second fiber optic cable 14.

The first focusing lens 15 images the light through a second shutter assembly 16 onto a sample under measurement 17. Light is reflected (or transmitted) by the sample under measurement 17.

The second fiber-optic cable 14 comprises at least one illumination fiber 14a that delivers (polychromatic or monochromatic) light from the lamp 11 to the sample under measurement 17 and a single detector fiber 14b that collects reflected light from the first focusing lens 15 and light reflected from the sample under measurement 17, and directs it to a first detector 21. The output of the first detector 21 is coupled to a controller 22.

There may be multiple illumination fibers 14a. In a reduced-to-practice embodiment of the spectrometer 10, six outer illumination fibers 14a are used that surround a single detector fiber 14b.

The vertical position of the first focusing lens 15 controls the measurement spot size. The first focusing lens 15 also provides for improved collection efficiency. Since, as will be described in more detail below, the light reflected from the first focusing lens 15, or optical element 15, (that includes light reflected from the sample under measurement 17) is used to monitor changes in the spectrometer 10 (i.e., burn-down of the lamp 11, fiber solarization, etc.), this lens 15 is not anti-reflection (AR) coated.

The first detector 21 converts light that is reflected from the first lens 15 (or optical element 15) and the light reflected from the sample under measurement 17, that is coupled to it by way of the single detector fiber 14b, into electrical signals that can be processed by the controller 22. In the reduced-to-practice embodiment of the spectrometer 10 a 2048 element CCD silicon detector array is used as the first detector 21. Also, a fixed grating 23 is used to chromatically separate the light so that each pixel receives light of a distinct narrow range of wavelengths.

In operation, light from the lamp 11 is directed towards the sample under measurement 17 by way of the second fiber-optic cable 14. The light is focused onto the sample under measurement 17 by the lens first lens 15. Light is reflected by the first lens 15 and reflected from the sample under measurement 17 is focused onto the second fiber optic cable 14. This reflected light then is directed to the first detector 21 by way of the single detector fiber 14b in the second fiber-optic cable 14.

The controller 22 implements an algorithm that calculates the reflection at each wavelength using the following equation:

$$\text{Reflection} = I_i * ((S_i - B2_i) - (B1_i - B3_i)) / ((R_i - B2_i) - (B1_i - B3_i)) \quad \text{Equation (1)}$$

where, $S_i$ is the signal strength at wavelength i for the unknown sample under measurement 17, $R_i$ is the signal strength at wavelength i for a reference sample of known reflection, $B1_i$ is the background signal strength at wavelength i with the first shutter assembly 12 open (light source 11 on) and the second shutter assembly 16 closed, $B2_i$ is the background signal strength at wavelength i with the first shutter assembly 12 closed (light source 11 off) and the second shutter assembly 16 open, $B3_i$ is the background signal strength at wavelength i with the first shutter assembly 12 closed (light source 11 off) and the second shutter assembly 16 closed, and $I_i$ is the known reflection at wavelength i of the reference sample.

It should be pointed out that, in order to increase the signal to noise ratio, the B1 scan integration time is typically set much longer than the integration time for all other scans. The reason for this is that even though the optical element 15 is not anti-reflection coated, the reflection from the optical element 15 is typically small compared the reflection from the sample 17. If the integration time for B1 is different from the integration time of all other scans, the B1 scan value is scaled by a factor equal to the integration time used for all other scans divided by the integration time used for the B1 scan. This scaled value is used in Equation (1).

The B3 scan measures the dark current of the first detector 21. This level is subtracted from all scans. The ambient light level may be calculated by subtracting the dark current (B3) from the B2 scan. To obtain the amount of light reflected from the first lens 15, $B3_i$ is subtracted from $B1_i$.

The purpose of the first shutter assembly 12 is to turn off the light source 11 so that the ambient light level can be determined as well as the dark current of the first detector 21. In some spectrometers 10, it is not necessary to use the first shutter assembly 12. One reason why the first shutter assembly 12 may not be necessary is that, if the dark current or ambient light levels are so low compared to the actual reflection signals, they can be ignored.

Another reason is that the light source 11 can be turned off by the controller 22. An example of this is a pulsed Xenon lamp 11. If the controller 22 does not pulse the lamp 11, this is equivalent to closing the shutter. Pulsed Xenon lamps 11 are very useful in in-situ monitoring applications, since many times the sample under measurement 17 is rotating. In these in-situ applications, the pulses of light are synchronized with the rotation of the sample under measurement 17 so that just one location on the sample under measurement 17 is measured.

In the description below, a closed first shutter assembly 12 can be realized by turning off the light source 11. If the ambient level or dark current are negligible, the scans that isolate these levels are bypassed and these levels are set to zero in the calculations.

The B1 scan primarily measures a small amount of reflected light from the first lens 15 plus the dark current of the first detector 21. This level is always present during a sample measurement and must be properly subtracted from both the reference sample and the unknown sample measurement during the calculation of sample reflection.

If one monitors this reflection from the first lens 11 (or optical element 15) and sample, very useful information is available related to the system response versus time. It is this monitoring of the reflected light from the first lens 15 and sample, and correction for the system changes over time derived from this reflected light that is a unique and novel aspect of the present invention.

In many applications, it is extremely inconvenient or impossible to continually measure the reference sample. For example, in an in-situ application, before a deposition or etch run starts, a user of the equipment can place the reflection reference sample inside a process chamber and initiate a reference or calibration measurement. However, once the user puts a sample to be deposited or etched inside the chamber and pulls vacuum, the chamber is not be opened again until the process is complete. Sometimes the deposition or etch process can take several days. In this time there could be significant degradation of the strength of the lamp 11. If this system change is not properly accounted for, there could be significant process errors.

In the present invention, the reflection of light from and by way of the first lens 15 is monitored and changes to the spectrometer 10 are corrected based upon these measurements.

Prior to any measurements, an initial calibration is performed. The following steps are performed in an initial calibration. (1) A background scan with the first shutter assembly 12 open (light source 11 on) and the second shutter assembly 16 closed. (2) A background scan with the first shutter assembly 12 closed (light source 11 off) and the second shutter assembly 16 open. (3) A background scan with the first shutter assembly 12 closed (light source 11 off) and the second shutter assembly 16 closed. (4) A reference scan of a sample of known reflection (first shutter assembly 12 open (light source 11 on), and second shutter assembly 16 open).

To perform a measurement at any time after the initial calibration, the sample under measurement 17 is placed on a sample holder and the following scans are taken. (1) A background scan with the first shutter assembly 12 open (light source 11 on) and the second shutter assembly 16 closed. (2) A background scan with the first shutter assembly 12 closed (light source 11 off) and the second shutter assembly 16 open (this scan is optional since in most cases the ambient room level is small it can be ignored or it does not appreciably change so that the ambient light level it can be assumed to be constant, i.e., the same value as measured during calibration). (3) A background scan with the first shutter assembly 12 closed (light source 11 off) and the second shutter assembly 16 closed (this scan is optional since in most cases the dark current level is small so it can be ignored or it does not appreciably change so that it can be assumed to be constant, i.e., the same value as measured during calibration). (4) A sample scan of an unknown sample, i.e., the sample under measurement 17 (first shutter assembly 12 open (light source 11 on), and second shutter assembly 16 open).

In steps 1–4 immediately above, the reference sample is not re-measured. It is most probable that if the lamp 11 has degraded, the reference sample, if measured, would give a different result from the initial calibration. Since there is no opportunity to measure the reference again, it's new value is inferred from the measured light level coupled to the first detector 21 by the first lens 15, and this value (Equation (2)) is inserted into Equation (1) to calculate the reflection of the unknown sample.

$$Ri=Ri(0)*(B1_i-B3_i)/(B1_i(0)-B3_i(0))$$ Equation (2)

where, $R_i(0)$ is the signal strength at wavelength i for the reference sample of known reflection at initial calibration, $B1_i$ is the current background signal strength at wavelength i with the first shutter assembly 12 open (light source 11 on) and the second shutter assembly 16 closed, $B1_i(0)$ is the background signal strength at wavelength i with the first shutter assembly 12 open (light source 11 on) and the second shutter assembly 16 closed at the time of initial calibration, $B3_i$ is the current background signal strength at wavelength i with the first shutter assembly 12 closed (light source 11 off) and the second shutter assembly 16 closed, and $B3_{i(0)}$ is the background signal strength at wavelength i with the first shutter assembly 12 closed (light source 11 off) and the second shutter assembly 16 closed at the time of initial calibration. This is the value that is inserted in Equation (1).

Also, in certain applications, the first shutter assembly 12 and the second shutter assembly 16 are not required. For this to be true, the dark level and ambient levels must be negligible. Furthermore, there must be occasional opportunity for spectrometer 10 system to measure the background with no sample present. An example of this is a conveyor belt system, where the parts move underneath the measurement head and the controller 22 is aware of when there is a sample in opposition. When there is no sample, the controller 22 has an opportunity to measure the background which almost entirely due to the reflection from the lens. In this way, no shutter assemblies 12, 16 are required.

A reflection and transmission spectrometer 10 will now be described. If the spectrometer 10 is configured for transmission, and as is shown in FIG. 1, a second focusing lens 18, third fiber-optic cable 23, and second detector 24 are required. The controller 22 is coupled to the detector 24. Since the light reflected from and by way of the first focusing lens 15 is measured, any spectrometer 10 that is set up for transmission also has the capability of measuring reflection.

The equations and steps for measuring transmission are slightly different from those discussed above with regard to reflection, but the principal is the same. The light reflected from and by way of the first focusing lens 15 is monitored and this reflection value is used to adjust the reference value in a transmission calculation.

Light from the lamp 11 is directed towards the sample under measurement 17 by way of the second fiber-optic cable 14. The light is focused onto the sample under measurement 17 by the first focusing lens 15. Light that is transmitted by or reflected off of the sample under measurement 17 toward the second focusing lens 18 is collected by the second focusing lens 18 and focused onto the third fiber optic cable 23. The light is coupled to the second detector 24 by way of the third fiber optic cable 23.

The controller 22 implements an algorithm that calculates the transmission at each wavelength from the following equation:

$$\text{Transmission}=I_i*((S_i-B2_i)-(B1_i-B3_i)/((T_i-B2_i)-(B1_i-B3_i)))$$ Equation (3)

where, $S_i$ is the signal strength at wavelength i for the unknown sample, $T_i$ is the signal strength (first detector 21) at wavelength i for the reference sample of known transmission, $B1_i$ is the background signal strength (first detector 21) at wavelength i with the first shutter assembly 12 open (light source 11 on) and the second shutter assembly 16 closed, $B2_i$ is the background signal strength (first detector 21) at wavelength i with the first shutter assembly 12 closed (light source 11 off) and the second shutter assembly 16 open, $B3_i$ is the background signal strength (first detector 21) at wavelength i with the first shutter assembly 12 closed (light source 11 off) and the second shutter assembly 16 closed, and $I_i$ is the known transmission at wavelength i of the reference sample.

Prior to any transmission measurements, an initial calibration is performed. The following steps are performed in the initial calibration. (1) A background scan of both detectors 21, 24 with the first shutter assembly 12 open (light source 11 on) and the second shutter assembly 16 closed. (2) A background scan of both detectors with the first shutter assembly 12 closed (light source 11 off) and the second shutter assembly 16 open, (3) A background scan of both detectors with the first shutter assembly 12 closed (light source 11 off) and the second shutter assembly 16 closed. (4) A reference scan (using the first detector 21 only) of a sample of known transmission (first shutter assembly 12 open (light source 11 on), and second shutter assembly 16 open).

To perform a measurement at any time after the initial calibration, a sample under measurement 17 is placed on a sample holder and the following scans are taken. (1) A background scan (first and second detectors 21, 24) with the first shutter assembly 12 open (light source 11 on) and the second shutter assembly 16 closed. (2) A background scan (first and second detectors 21, 24) with the first shutter assembly 12 closed (light source 11 off) and the second shutter assembly 16 open (this scan is optional since in most cases the ambient room level is small it can be ignored or it does not appreciably change so that the ambient light level it can be assumed to be constant, i. e. the same value as measured during calibration).

(3) A background scan (first and second detectors 21, 24) with the first shutter assembly 12 closed (light source 11 off) and the second shutter assembly 16 closed (this scan is optional since in most cases the dark current level is small so it can be ignored or it does not appreciably change so that it can be assumed to be constant, i.e. the same value as measured during calibration). (4) A sample scan (first detector 21 only) of unknown sample (first shutter assembly 12 open (light source 11 on), and second shutter assembly 16 open).

In steps 1–4 immediately above, the reference sample is not re-measured. It is most probable however, that if the lamp 11 has degraded, the reference sample, if measured, would give a different result from the initial calibration. Since there is no opportunity to measure the reference again, it's new value is inferred from the measured light level reflected from the first lens 15, and this value (Equation (4)) is inserted into Equation (3) to calculate the reflection of the unknown sample:

$$Ti=Ti(0)*(B1_{i2}-B3_{i2})/(B1_{i2}(0)-B3_{i2}(0))$$ Equation (4)

where, $T_i(0)$ is the signal strength (first detector 21), at wavelength i for the reference sample of known transmission at initial calibration, $B1_{i2}$ is the current background signal strength (second detector 24), at wavelength i with the first shutter assembly 12 open (light source 11 on) and second shutter assembly 16 closed, $B1_{i2}0)$ is the background signal strength (second detector 24), at wavelength i with the first shutter assembly 12 open (light source 11 on) and the second shutter assembly 16 closed at the time of initial calibration, $B3_{i2}$ is the current background signal strength (second detector 24), at wavelength i with the first shutter assembly 12 closed (light source 11 off) and the second shutter assembly 16 closed, and $B3_{i2}(0)$ is the background signal strength (second detector 24) with the first shutter assembly 12 closed (light source 11 off) and the second shutter assembly 16 closed at the time of initial calibration. This is the value for the transmission reference that is inserted in Equation (3).

Figure 2:
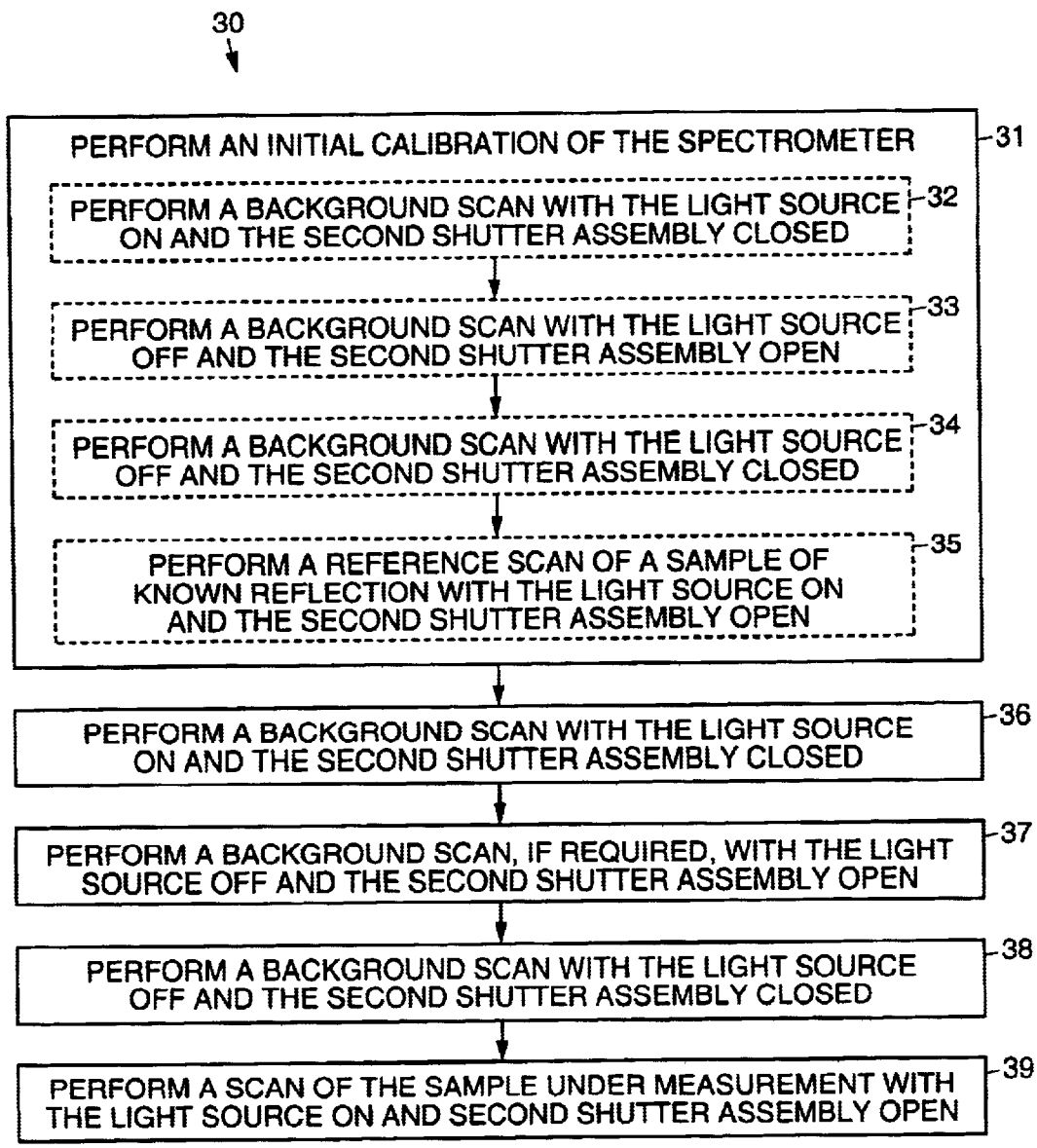
FIGS. 2 and 3 are flow diagrams illustrating exemplary methods in accordance with the principles of the present invention.

The present invention also contemplates a spectrometer auto-calibrating methods 30, 40 for auto-calibrating a spectrometer 10. An exemplary reflection spectrometer auto-calibrating method 30 is illustrated in the flow diagram shown in FIG. 2. The exemplary reflection spectrometer auto-calibrating method 30 comprises the following steps.

An initial calibration of the spectrometer is performed 31. A background scan is performed 36 with the light source on and the second shutter assembly closed. A background scan is performed 37, if required, with the light source off and the second shutter assembly open. A background scan is performed 38 with the light source off and the second shutter assembly closed. A sample scan of the sample under measurement is performed 39 with the light source on and second shutter assembly open.

Figure 3:
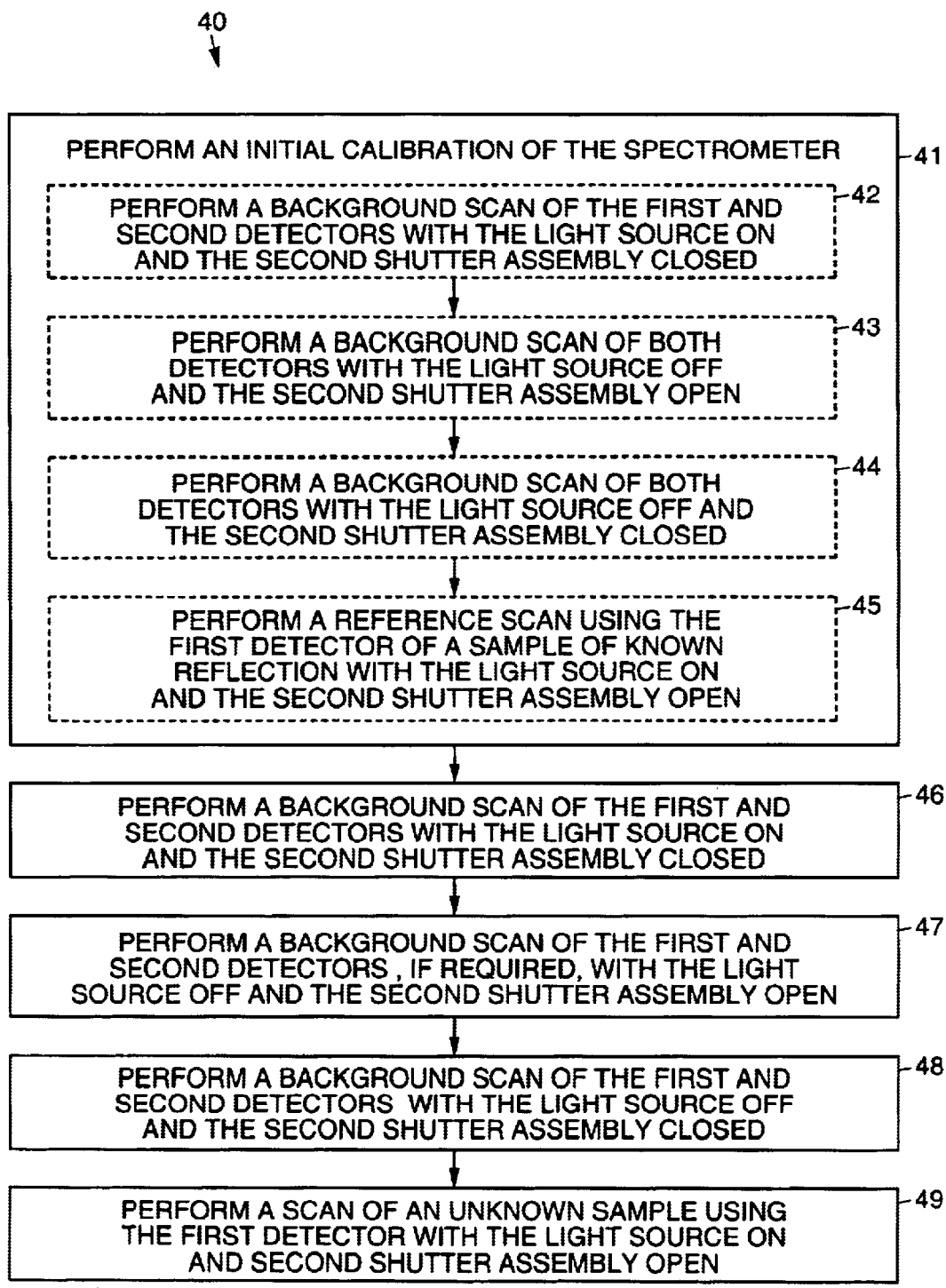

An exemplary transmission spectrometer auto-calibrating method 30 is illustrated in the flow diagram shown in FIG. 3. The exemplary transmission spectrometer auto-calibrating method 30 comprises the following steps.

An initial calibration of the spectrometer 41. A background scan of the first and second detectors is performed 46 with the light source on and the second shutter assembly closed. A background scan is performed 47, if required, of the first and second detectors with the light source off and the second shutter assembly open. A background scan is performed 48, if required, of the first and second detectors with the light source off and the second shutter assembly closed. A sample scan is performed 49 using the first detector of an unknown sample with the light source on and second shutter assembly open.

It is to be understood that the fiber-optic cable 14 may be replaced by an appropriate number of lenses and a beam splitter (illustrated by the dashed box at the top of FIG. 1). One possible reason for not using the fiber-optic cable 14 is poor transmission. Most fiber-optic cables 14 do not transmit below 220 nm. Essentially, if the fiber-optic cable 14 is not used, a beam splitter is located somewhere before the optical element 15. An example of a beam splitter that may be used is a 50% non-polarizing 45-degree beam splitter. Light from the lamp 11 would either transmit or reflect from the beam splitter to reach the optical element 15. On the return path, the reflected light from the optical element 15 would either reflect or transmit from the beam splitter to reach the detector 21. An optical designer skilled in the art can select the appropriate lenses so that (a) light from the lamp 11 is delivered efficiently to the sample 17, and (b) reflected light from both the sample 17 and optical element 15 is delivered efficiently to the detector 21.

Thus, auto-calibrating spectrometers and spectrometer auto-calibrating methods have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An auto-calibrating spectrometer comprising:
   a light source;
   a reference sample having known reflection;
   a first detector for outputting electrical signals corresponding to light signals that are detected thereby;
   an first optical element that transmits light toward the reference sample and that reflects a small amount of light;
   optical coupling apparatus that couples light from the light source to the first optical element and couples light reflected from the first optical element and light reflected from the reference sample to the first detector;

a shutter assembly disposed between the first optical element and the reference sample that selectively couples light or inhibits light transmitted by the first optical element from impinging upon and being reflected by the reference sample; and a controller coupled to the first detector that processes the electrical signals output thereby corresponding to levels of light derived from the first optical element and the reference sample and implements an algorithm that calculates a calibration value for the spectrometer at each wavelength of light output by the light source using a predetermined equation to autocalibrate the spectrometer.

2. The spectrometer recited in claim 1 wherein the optical coupling apparatus comprises a fiber optic cable that couples light from the light source to the first optical element, and which comprises at least one illumination fiber for coupling light to a sample under measurement disposed in place of the reference sample, and a detector fiber that collects light reflected from the first optical element and directs it to the first detector.

3. The spectrometer recited in claim 1 wherein the optical coupling apparatus comprises one or more lenses and a beam splitter that cooperate to couple light from the light source to the first optical element and a sample under measurement disposed in place of the reference sample, and to the first detector.

4. The spectrometer recited in claim 1 wherein the light source comprises a polychromatic light source.

5. The spectrometer recited in claim 1 wherein the light source comprises a monochromatic light source.

6. The spectrometer recited in claim 1 further comprising a second shutter assembly disposed between the optical coupling apparatus and the light source.

7. The spectrometer recited in claim 1 wherein the first optical element not anti-reflection coated.

8. The spectrometer recited in claim 2 wherein the fiber optic cable comprises a plurality of outer illumination fibers that surround a single detector fiber.

9. The spectrometer recited in claim 2 wherein the light source comprises a polychromatic light source, and which further comprises a fixed grating disposed between the fiber optic cable and the first detector that chromatically separates the light so that each pixel receives light of a distinct narrow range of wavelengths.

10. The spectrometer recited in claim 6 wherein the predetermined equation is:

$$\text{Reflection} = I_i * ((S_i - B2_i) - (B1_i - B3_i) / ((R_i - B2_i) - (B1_i - B3_i))$$

where, $S_i$ is the signal strength at wavelength i for the sample under measurement, $R_i$ is the signal strength at wavelength i for a reference sample of known reflection, $B1_i$ is the background signal strength at wavelength i with the light source on and with reflection only from a first focusing lens comprising the first optical element, $B2_i$ is the background signal strength at wavelength i with the light source off and the second shutter assembly open, $B3_i$ is the background signal strength at wavelength i with the light source off and the second shutter assembly closed, and $I_i$ is the known reflection at wavelength i of the reference sample.

11. The spectrometer recited in claim 10 wherein Ri is computed using the equation:

$$Ri = Ri(0) * (B1_i - B3_i) / (B1_i(0) - B3_i(0))$$

where, $R_i(0)$ is the signal strength at wavelength i for the reference sample of known reflection at initial calibration, $B1_i$ is the current background signal strength at wavelength i with the light source off and the second shutter assembly closed $B1_i(0)$ is the background signal strength at wavelength i with the light source on and the second shutter assembly closed at the time of initial calibration, $B3_i$ is the current background signal strength at wavelength i with the light source off and the second shutter assembly closed, and $B3_i(0)$ is the background signal strength at wavelength i with the light source off and the second shutter assembly closed at the time of initial calibration.

12. The spectrometer recited in claim 6 further comprising:

a second optical element for receiving light that is transmitted by or reflected off of the a sample under measurement disposed in place of the reference sample toward it;

a second detector coupled to the controller; and a second fiber optic cable for coupling light received by the second optical element to the second detector;

and wherein the controller processes the electrical signals output by the respective detectors and implements an algorithm that calculates a calibration value for the spectrometer at each wavelength of light output by the light source using a second predetermined equation to autocalibrate the spectrometer.

13. The spectrometer recited in claim 12 wherein the second predetermined equation comprises:

$$\text{Transmission} = I_i * ((S_i - B2_i) - (B1_i - B3_i) / ((T_i - B2_i) - (B1_i - B3_i))$$

where, $S_i$ is the signal strength at wavelength i for the sample under measurement, $T_i$ is the signal strength of the first detector at wavelength i for a reference sample of known transmission, $B1_i$ is the background signal strength of the first detector at wavelength i with the light source on and the second shutter assembly closed, $B2_i$ is the background signal strength of the first detector at wavelength i with the light source off and the second shutter assembly open, $B3_i$ is the background signal strength of the first detector at wavelength i with the light source off and the second shutter assembly closed, and $I_i$ is the known transmission at wavelength i of the reference sample.

14. The spectrometer recited in claim 13 wherein Ti is computed using the equation:

$$Ti = Ti(0) * (B1_{i2} - B3_{i2}) / (B1_{i2}(0) - B3_{i2}(0))$$

where, $T_i(0)$ is the signal strength of the first detector at wavelength i for the reference sample at initial calibration, $B1_{i2}$ is the current background signal strength of the second detector at wavelength i with the light source is on and second shutter assembly is closed, $B1_{i2}0)$ is the background signal strength of the second detector wavelength i with the light source on and the second shutter assembly closed at the time of initial calibration, $B3_{i2}$ is the current background signal strength of the second detector at wavelength i with the light source off and the second shutter assembly closed, and $B3_{i2(0)}$ is the background signal strength of the second detector with the light source off and the second shutter assembly closed at the time of initial calibration.

15. An auto-calibrating method for use with a spectrometer comprising a light source, an optical element, a detector for outputting electrical signals corresponding to detected light signals, optical coupling apparatus that couples light from the light source to the optical element, and couples light reflected from the optical element and a sample under measurement to the detector, a shutter assembly that selectively couples light or inhibits light from impinging upon and reflected by a reference sample having known reflection or the sample under measurement, and a controller coupled to the detector that processes the electrical signals output thereby and implements the method to calculate a reflection value for the spectrometer at each wavelength of light output by the light source to autocalibrate the spectrometer, the method comprising the steps of:

performing an initial calibration of the spectrometer;

performing a background scan with the light source on and the shutter assembly closed;

performing a background scan, if required, with the light source off and the shutter assembly open;

performing a background scan with the light source off and the shutter assembly closed; and performing a sample scan of the sample under measurement with the light source on and the shutter assembly open.

16. The method recited in claim 15 wherein the initial calibration step comprises the steps of:

performing a background scan with the light source on and the shutter assembly closed;

performing a background scan with the light source off and the shutter assembly open;

performing a background scan with the light source off and the shutter assembly closed; and performing a reference scan of a sample of known reflection with the light source on and the shutter assembly open.

17. An auto-calibrating method for use with a spectrometer comprising a light source, an optical element, first and second detectors for outputting electrical signals corresponding to detected light signals, a shutter assembly that selectively couples light or inhibits light from impinging upon and reflected by a reference sample having known reflection or the sample under measurement, optical coupling apparatus for coupling light from the light source to the optical element, and coupling light reflected from the optical element and a sample under measurement to the first detector, and for coupling light that is transmitted by or reflected off of the sample under measurement to the second detector, and a controller coupled to the first and second detectors that processes the electrical signals output thereby and implements the method to calculate a transmission value for the spectrometer at each wavelength of light output by the light source to autocalibrate the spectrometer, the method comprising the steps of:

performing an initial calibration of the spectrometer;

performing a background scan of the first and second detectors with the light source on and the shutter assembly closed;

performing a background scan, if required, of the first and second detectors with the light source off and the shutter assembly open;

performing a background scan, if required, of the first and second detectors with the light source off and the shutter assembly closed; and performing a sample scan using the first detector of an unknown sample with the light source on and the shutter assembly open.

18. The method recited in claim 17 wherein the initial calibration step comprises time steps of:

performing a background scan of the first and second detectors with the light source on and the shutter assembly closed;

performing a background scan of both detectors with the light source off and the shutter assembly open performing a background scan of both detectors with the light source off and the shutter assembly closed; and performing a reference scan using the first detector of a sample of known transmission with that light source on and the shutter assembly open.

* * * * *